(12) United States Patent
Boutou et al.

(10) Patent No.: US 8,157,686 B2
(45) Date of Patent: Apr. 17, 2012

(54) POWER TRANSMISSION DEVICE FOR A MOTOR VEHICLE WHICH IS EQUIPPED WITH A FREE WHEEL MECHANISM THAT DRIVES AN OIL PUMP

(75) Inventors: Thomas Boutou, Paris (FR); Serge Belmont, Boulogne-Blllancourt (FR); Olivier Boury, Nanterre (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1177 days.

(21) Appl. No.: 11/912,874

(22) PCT Filed: Apr. 24, 2006

(86) PCT No.: PCT/FR2006/050375
§ 371 (c)(1),
(2), (4) Date: Oct. 26, 2007

(87) PCT Pub. No.: WO2006/114542
PCT Pub. Date: Nov. 2, 2006

(65) Prior Publication Data
US 2008/0194369 A1    Aug. 14, 2008

(30) Foreign Application Priority Data

Apr. 26, 2005   (FR) ...................................... 05 51072

(51) Int. Cl.
*F16H 3/72*   (2006.01)
(52) U.S. Cl. ....................... 475/5; 192/48.92; 180/65.31
(58) Field of Classification Search .............. 475/5, 297; 192/48.92; 180/65.1, 65.21, 65.31, 65.6; 74/810.1
See application file for complete search history.

(56) References Cited

U.S. PATENT DOCUMENTS

| | | | |
|---|---|---|---|
| 5,799,744 A | 9/1998 | Yamaguchi et al. | |
| 5,823,282 A | 10/1998 | Yamaguchi et al. | |
| 5,993,169 A | 11/1999 | Adachi et al. | |
| 6,306,057 B1 * | 10/2001 | Morisawa et al. | 475/5 |
| 6,863,140 B2 | 3/2005 | Noreikat et al. | |
| 7,128,677 B2 * | 10/2006 | Supina et al. | 475/5 |
| 7,195,573 B2 | 3/2007 | Bezian et al. | |
| 2002/0060099 A1 * | 5/2002 | Takenaka et al. | 180/65.1 |
| 2004/0166980 A1 * | 8/2004 | Supina et al. | 475/5 |
| 2009/0095548 A1 * | 4/2009 | Tamba et al. | 180/65.21 |
| 2009/0166107 A1 * | 7/2009 | Besnard et al. | 180/65.6 |

FOREIGN PATENT DOCUMENTS

DE    19923154 A1    11/1999

(Continued)

OTHER PUBLICATIONS

International Search Report mailed Oct. 5, 2006 in PCT/FR2006/050375.

*Primary Examiner* — J. Allen Shriver, II
*Assistant Examiner* — James Triggs
(74) *Attorney, Agent, or Firm* — Nicolas E. Seckel

(57) ABSTRACT

The invention relates to a device (1) for the transmission of power between a shaft (2) of a heat engine (3) and a wheel (5) axle shaft (4) of a motor vehicle. The inventive device (1) comprises at least one electrical machine (6, 7) comprising a machine shaft (8, 9) and a mechanical pump (11) comprising a pump shaft (55). The shaft (2) of the engine (3) and the machine shaft (8, 9) are connected to the pump shaft (55) by means of a mechanism (12) comprising two free wheels. The connection between the pump (11) and the shafts (8, 9) of the transmission device is such that the pump (11) can be driven in any vehicle operating mode.

13 Claims, 3 Drawing Sheets

FOREIGN PATENT DOCUMENTS

Figure 1:
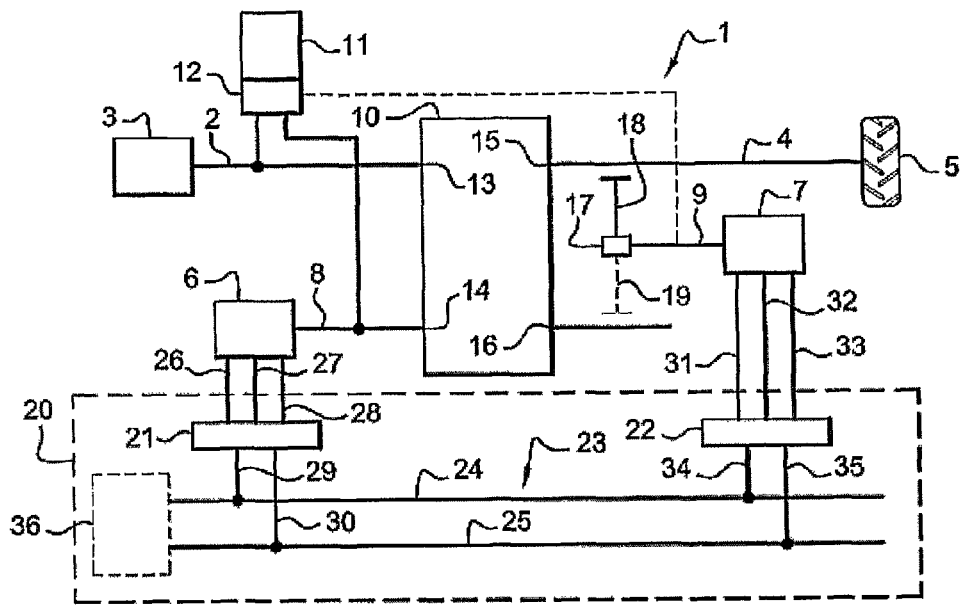

| | | |
|---|---|---|
| EP | 0821187 A | 1/1998 |
| EP | 1197371 A | 4/2002 |
| FR | 2832357 A1 | 5/2003 |
| GB | 2339606 A | 2/2000 |
| JP | 08324262 A | 12/1996 |
| JP | 2004100725 A | 4/2004 |

* cited by examiner

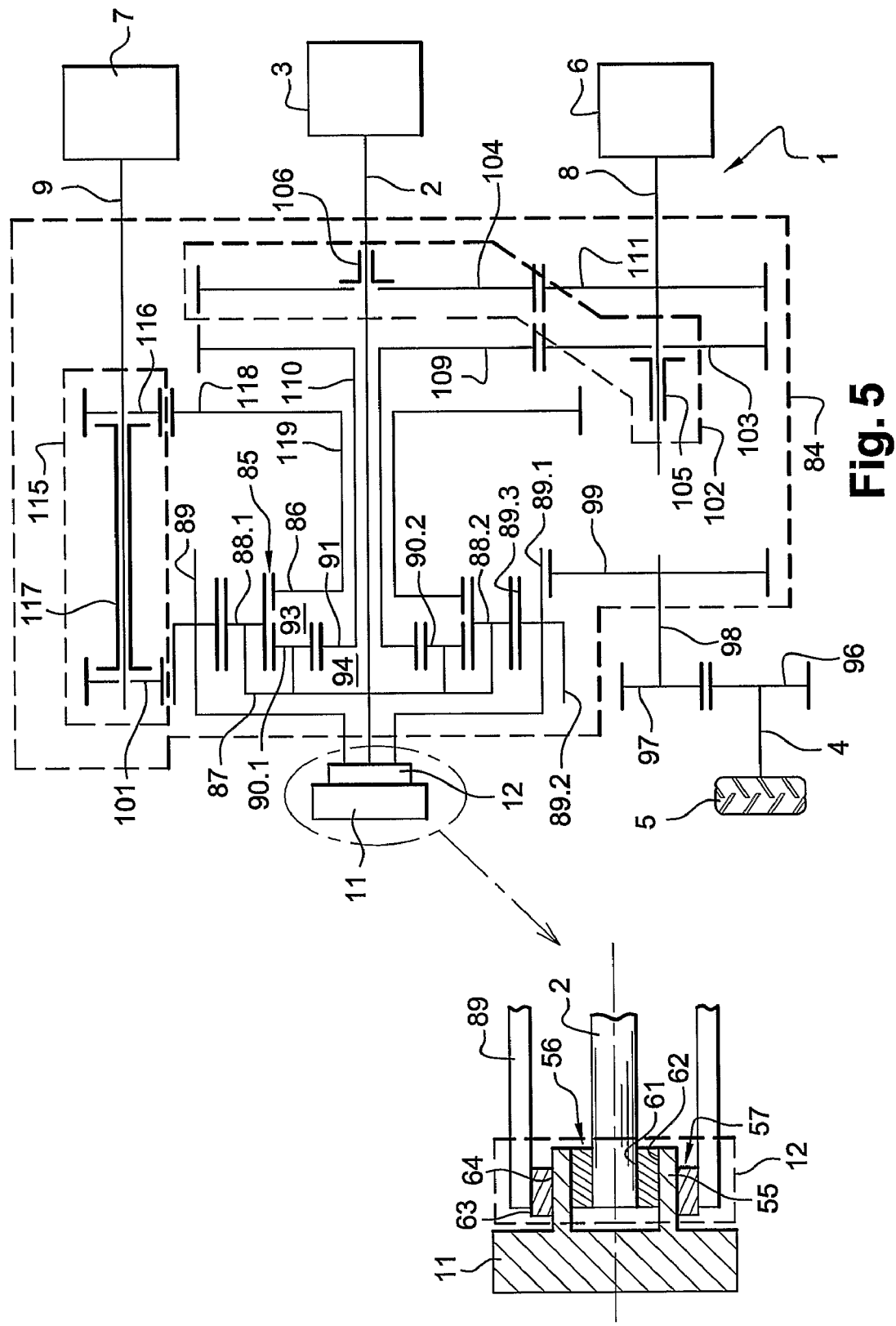

POWER TRANSMISSION DEVICE FOR A MOTOR VEHICLE WHICH IS EQUIPPED WITH A FREE WHEEL MECHANISM THAT DRIVES AN OIL PUMP

The present invention concerns a power transmission device for a motor vehicle equipped with a freewheel mechanism that drives an oil pump. A particular purpose of the invention is to reduce friction between the mechanical parts of the transmission device as much as possible. The invention has a particularly useful application in hybrid propulsion motor vehicles, but it could also be used in other types of hybrid propulsion land vehicles.

Transmission devices are known for hybrid vehicles that have a heat engine, two electrical machines and one, two or more planetary gear trains connected to one another within a mechanical assembly. An example of such a transmission device is described in the French patent application FR-A-2832357. With these transmission devices, the power of the heat engine can be transmitted directly to the wheels or split through an electrical system.

The electrical system includes the electrical machines, which are capable of functioning as a motor or as a generator, depending on levels of electrical and/or mechanical energies received at their terminals and on their shaft, respectively. The split power is retransmitted to the wheels of the vehicle or stored, if applicable, in a storage system. This split power makes it possible to accurately adjust the torque applied to the wheels of the vehicle to match the request of a driver, and accurately adjust the torque and speed of the heat engine as well, so as to optimize its performance. This adjustment of the torque applied to the wheels enhances driving comfort, whereas adjusting the operating point of the heat engine helps to save energy.

When a storage system such as a battery is connected to it, such a device is operable in two operating modes. That is, in a first operating mode, called "hybrid mode", the wheel shaft is driven simultaneously by the heat engine and by at least one of the electrical machines. In a second mode, called "electrical mode", the wheel shaft is driven by at least one of the electrical machines, whereas the heat engine is off.

To prevent wear and seizing up of the mechanical parts of this device, such as gears, bearings and shafts connected to one another inside the mechanical assembly, these parts are covered with a thin layer of oil. Thus, the mechanical assembly is generally lubricated as soon as one of the shafts of the device begins to rotate. This lubrication is generally performed using a mechanical oil pump.

In known systems, the oil pump is simultaneously connected to the heat engine shaft and to the shaft of one of the electrical machines. This connection between the pump and the two shafts is generally made via a mechanism with two freewheels. This mechanism has a driven ring and two driving rings. The driving rings drive the driven ring when they are rotating at a higher speed than that of the driven ring. The driven ring is capable of rotating freely when the driving rings are rotating at a lower speed than that of the driven ring.

More precisely, in known systems, a shaft of the pump is connected to the driven ring, whereas the engine shaft and the electrical machine shaft are each connected to a driving ring. In this way, the pump can be driven at the higher of the rotation speeds of the two shafts, in order to ensure lubrication at the operating points with the highest demand.

However, the operation of this type of system is not as robust as one would want. In fact, in such a system, when one of the elements malfunctions, it generally causes the whole system to malfunction. For example, if the driven ring is damaged, neither of the two wheels can drive the rotation of the pump shaft.

In addition, industrial production of such a system can be difficult and expensive. That is, such a part is structurally complex and thus requires numerous machining operations. Each operation takes time and raises the cost of the system.

The invention thus proposes to solve these problems of malfunction and cost.

To this end, in the invention, the mechanism with two freewheels is made from two freewheel units with separate and distinct cages. In other words, these freewheel units have distinct and independent driven rings. This way, if the driven ring of one of the units is damaged, due to an impact, for example, the second unit can still operate correctly, independently of the damaged unit.

Furthermore, in the invention, the mechanism can be mass-produced at a low cost, since it can be made from two identical freewheel units. Each unit is easy to make independently, since it has only one driving ring and one driven ring. In order to manufacture the invention, simple, elementary units are thus produced in large quantities, whereas to produce the system according to the state of the art, complex mechanisms had to be produced in small quantities.

More precisely, in the mechanism according to the invention, the engine shaft and the shaft of an electrical machine are each connected to a driving ring, whereas the pump shaft is connected to the two driven rings of the mechanism.

In a particular embodiment, the pump shaft is connected inside the freewheel units, whereas the engine shaft and the machine shaft are connected outside the freewheel units. As a variant, the freewheels are positioned one above the other, and the pump shaft is connected between the freewheels.

In a particular embodiment, the freewheel units have rollers that engage with a face of the driven ring. In a braced position, these rollers drive the driven ring in rotation, whereas in a free position, these rollers allow the driven rings to rotate freely.

In addition, in the invention, the oil pump is connected to shafts of the transmission device in such a way that it lubricates the mechanical parts of the transmission device, regardless of the vehicle operating mode. That is, the pump is driven when the vehicle is operating in hybrid mode or electrical mode, but also when the vehicle is stopped (with a machine and/or the motor on), moving in reverse, or being towed.

The invention thus concerns a power transmission device for a motor vehicle equipped with a freewheel mechanism that drives an oil pump shaft, this transmission device being positioned between a shaft of a heat engine and a wheel shaft, this device having:
- at least one electrical machine with a machine shaft,
- a mechanical assembly connecting the engine shaft, the machine shaft and the wheel shaft to one another,
- the engine shaft and the machine shaft being connected to the pump shaft via a freewheel mechanism, this mechanism having two distinct freewheel units independent of one another,
- the two freewheel units being ring-shaped and concentric with one another,
- the pump shaft, the engine shaft and the machine shaft being coaxial,
- the pump being driven regardless of the vehicle operating mode.

Figure 2:
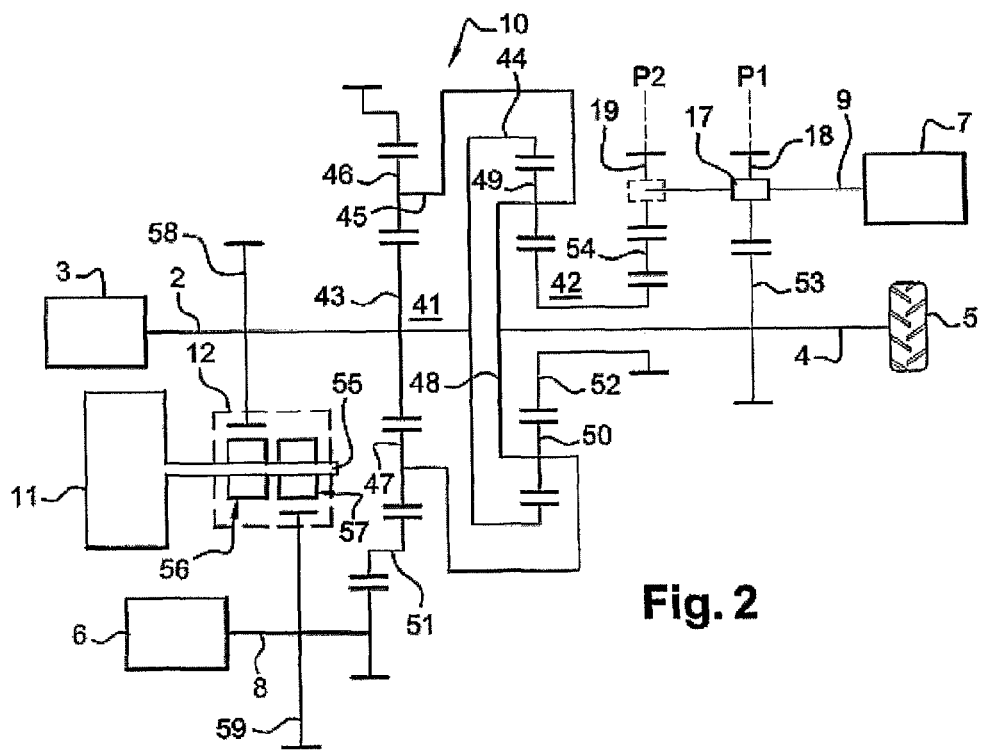

The following description and accompanying figures will make the invention more easily understood. These figures are given as an illustration, and are in no way an exhaustive representation of the invention. These figures show:

FIG. 1: a schematic representation of a transmission device according to the invention having a mechanical pump connected to a shaft of the engine and a shaft of one of the electrical machines;

FIG. 2: a schematic representation of a transmission device according to the invention having a mechanical pump connected to the inside of a mechanical assembly made up of two planetary gear trains;

FIG. 3: schematic representations of connections between a pump shaft, an engine shaft and a machine shaft via a mechanism with two freewheels according to the invention;

FIG. 4: schematic representations of a freewheel unit according to the invention;

FIG. 5: a schematic representation of a transmission device according to the invention in which the freewheel device is positioned so that it is driven regardless of the operating mode of the transmission device.

Identical elements retain the same reference from one figure to another.

FIG. 1 shows a schematic representation of a transmission device 1 between a shaft 2 of a heat engine 3 and a shaft 4 of wheels 5. This device 1 has a first electrical machine 6 and a second electrical machine 7 having a shaft 8 and a shaft 9, respectively. The shaft 2, the shaft 4, the shaft 8 and the shaft 9 are connected to one another via a mechanical assembly 10.

A mechanical oil pump 11 is connected to a shaft 2 of the engine 3 and to one of the shafts 8, 9 via a mechanism 12 with two freewheels. As previously mentioned, the device 1 is operable in two operating modes.

More precisely, the mechanical assembly (10) has a plurality of planetary gearsets connected to one another. Each planetary gear train generally has three different rotationally mobile elements: a sun gear, a planet carrier and a ring gear that intermesh. In the mechanical assembly 10, the planetary gear trains are connected to one another in such a way as to provide two degrees of freedom and four external mobile elements to which the shaft 2 of the engine 3, the shaft 4 of wheels 5, and the two shafts 8 and 9 of the electrical machines 6 and 7 will be connected.

Thus, the shaft 2 is linked to a first mobile element 13 of the assembly 10. The shaft 8 is linked to a second mobile element 14 of the assembly 10. The shaft 4 is linked to a third mobile element 15 of the assembly 10. The shaft 9 is connectable either to the third mobile element 15 directly coupled to the shaft 4 of wheels 5, or to a fourth mobile element 16 of the assembly 10. This coupling of the shaft 9 to the third element 15 or to the fourth mobile element 16 is achieved in particular via a dog clutch 17 and a first and second pinion 18 and 19.

In addition, an electrical system 20 connects the first and second machines 6 and 7 to one another. This system 20 includes in particular a first inverter 21, a second inverter 22 and an electrical bus 23 having two connections 24 and 25. In practice, this electrical bus 23 is a direct current bus. Phases 26-28 of the first machine 6 are connected to the first inverter 21, which is itself connected to the two connections 24 and 25 via two cable linkages 29 and 30. Phases 31-33 of the second machine 7 are connected to the second inverter 22, which is itself connected to the two connections 24 and 25 via two cable linkages 34 and 35.

In hybrid mode or in all-electric mode, the machines 6 and 7 can operate either as a motor or as a generator. When one of the machines 6 or 7 is operating as a generator, the alternating current signals detectable between phases 26-28 or 31-33 are transformed by the inverter 21 or 22 associated with this machine into a DC voltage signal detectable on the bus 23. When one of the electrical machines 6 or 7 is operating as a motor, the DC voltage signal detectable on the bus 23 is transformed into dephased AC voltage signals by the inverter 21 or 22 associated with this machine. These voltage signals are applied to the phases of the machine 6 or 7 that is operating as a motor.

In a case where no storage system is connected to the bus 23, the energy generated by one of the machines is automatically consumed by the other machine. As a variant, a storage system such as a battery 36 is connected to the bus 23. In a specific battery recharge mode, the two machines 6 and 7 can operate simultaneously or one at a time as a generator in order to store as much energy as possible in the battery. In a specific power boost mode, the two machines 6 and 7 can function simultaneously as a motor, for example while the heat engine 2 is off.

In a particular embodiment, the pump 11 is connected to the shaft 2 of the engine 3 and to the shaft 8 of the first machine 6 via the mechanism 12 with two freewheels. A purpose of this pump 11 is to lubricate the mechanical elements of the mechanical assembly 10, as well as the shafts 2, 4, 8 and 9. This pump 11 is activated as soon as one of the shafts 2, 4, 8 and 9 begins to rotate. As a variant, the pump 11 is connected to the shaft 2 of the engine 3 and the shaft 9 of the machine 7. In another variant, the pump 11 is connected simultaneously to the shaft 2, the shaft 8 and the shaft 9 via a mechanism 12 with three freewheels.

FIG. 2 shows a schematic representation of a transmission device 1 according to the invention that has a mechanical assembly 10 made up of a first planetary gear train 41 and a second planetary gear train 42. The pump 11 is connected in this embodiment to the shaft 2 of the engine 3 and the shaft 8 of the first machine 6. For greater simplicity, the electrical system 20 is not shown.

More precisely, a sun gear 43 of the first gear train 41 is connected to a ring gear 44 of the second gear train 42. And a planet carrier 45 of the first gear train 41 bearing the planet gears 46 and 47 is connected to a planet carrier 48 of the second gear train bearing the planet gears 49 and 50. Linking the two gear trains 41 and 42 with two connections reduces the four potential degrees of freedom of the assembly 10 to two degrees, and four accessible mobile elements are available.

Additionally, the shaft 2 of the engine 3 is connected to the sun gear 43 of the first gear train 41. The shaft 4 of wheels 5 is connected to the planet carrier 48 of the second gear train 42. The shaft 8 of the first machine 6 is connected to a ring gear 51 of the first gear train 41.

By moving along the shaft 9 of the second machine 7, the dog clutch 17 is capable of connecting this shaft 9 either to a sun gear 52 of the second gear train 42, or to the shaft 4 of wheels 5. When it is in a first position P1, the dog clutch 17 connects the shaft 9 to the shaft 4 via the pinion 18 and a wheel 53. The pinion 19 is then spinning freely on the shaft 9. When it is in a position P2, the dog clutch 17 connects the shaft 9 to the sun gear 52 via the pinion 19 and a wheel 54. The pinion 17 is then spinning freely on the shaft 9.

In addition, a pump shaft 55 is connected to the shaft 2 of the engine 3 and to the shaft 8 of the motor 6 via the mechanism 12 with two freewheels. This mechanism 12 with two freewheels has a first freewheel unit 56 and a second freewheel unit 57 that are distinct and independent. In other words, when they are not mounted inside the device 1, these two units 56 and 57 are not connected to one another.

In this embodiment, the shaft 2 of the engine 3 is connected to the first unit 56 via a gear wheel 58. And the shaft 8 of the first machine 6 is connected to the second freewheel unit 57 via a gear wheel 59. A more detailed description of the mechanism 12 is given in the following figures.

FIG. 3 show schematic representations of connections between a pump shaft 55, an engine shaft 2 and a machine shaft 60 via the mechanism 12 with two freewheels according to the invention. The machine shaft 60 can be either the shaft 8 of the first machine 6 or the shaft 9 of the second machine 7.

Figure 3A:
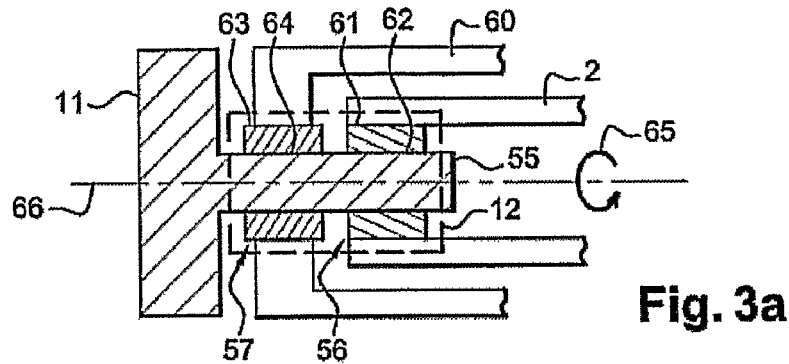

In FIG. 3a, as in the preceding figure, the mechanism 12 with two freewheels has the first freewheel unit 56 and the second freewheel unit 57.

The first unit 56 has a first driving ring 61 and a first driven ring 62. The second freewheel unit 57 has a second driving ring 63 and a second driven ring 64. These four rings 61-64 have the same diameter and are rotatable in the same direction 65 of rotation on an axis 66, which is the axis of the pump shaft 55.

A driving ring 61, 63 rotationally drives a driven ring 62, 64 when it is rotating at a speed greater than or equal to that of the driven ring 62, 64. A driven ring 62, 64 is capable of rotating freely when it is rotating at a speed greater than that of a driving ring 61, 63.

The pump shaft 55 is connected to the driven rings 62, 64. The shaft 55 is thus integral with the driven rings 62 and 64. The shaft 2 of the engine 3 and the machine shaft 60 are connected to the first and second driving rings 61, 63, respectively.

This way, the pump shaft 55 can always be driven by the shaft 2 or 60 that is rotating the fastest. That is, when the shaft 2 is rotating faster than the shaft 60, the pump shaft 55 is driven by this shaft 2 via the driving ring 61. That is, this driving ring 61 drives the driven ring 62, while the driven ring 64 is freewheeling and rotating freely inside the driving ring 63.

When the shaft 60 is rotating faster than the shaft 2, the pump shaft 55 is driven by the shaft 60 via the driving ring 63. That is, this driving ring 63 drives the driven ring 64, while the driven ring 62 is freewheeling and rotating freely inside the ring 61. This way, the shaft 55 can be driven even when one of the shafts 2 or 60 is stopped.

The two freewheel units 56 and 57 are usually identical. This way, it is possible to use standard freewheel units that are inexpensive and easy to produce.

In this embodiment, the driving rings 61, 63 are outer rings of the freewheel units 56 and 57, while the driven rings 62, 64 are inner rings. The outer rings have a greater diameter than the inner rings. Since the units are identical, the driving rings 61, 63 have the same diameter, and the driven rings 62, 64 also have the same diameter. As a variant, the rings 61, 63 are inner rings, while the rings 62, 64 are outer rings.

In this embodiment, the shaft 2 and the shaft 60 are directly connected to freewheel units 56 and 57. The pump shaft 55 is solid, while the shaft 2 and the shaft 60 are hollow. The machine shaft 60 has a greater diameter than that of the shaft 2, so that the shaft 2 can be mounted on the shaft 55, inside the shaft 60. These three shafts 2, 55 and 60 are coaxial, their three axes being merged with the axis 66.

As a variant, the shaft 2 is connected to the second freewheel unit 57, and surrounds the shaft 60, which is connected to the first freewheel unit 56.

Figure 3B:
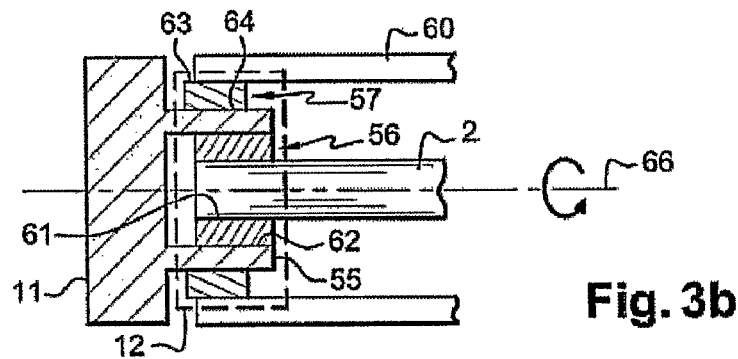

FIG. 3b shows a schematic representation of a variant of the mechanism 12 with two freewheels according to the invention.

In this variant, the freewheel units 56 and 57 are concentric, with the unit 56 positioned inside the unit 57.

More precisely, the driving ring 61 and the driven ring 62 of the first freewheel unit 56 correspond to an inner ring and an outer ring, respectively, of the unit 56. The driving ring 63 and the driven ring 64 of the second freewheel unit 57 correspond to an outer ring and an inner ring, respectively, of the unit 57.

In each unit, the outer ring once again has a greater diameter than the inner rings.

The pump shaft 55 is connected to the driven rings 62, 64, while the shafts 2 and 60 are connected to the driving rings 61 and 63, respectively. To this end, the pump shaft 55 and the shaft 60 are hollow, while the shaft 2 is solid. The pump shaft 55 is thus positioned between the driven ring 62 of the first unit 56 and the driven ring 64 of the second unit 57. The three shafts 2, 55 and 60 are once again coaxial, their axis merging with the axis 66.

As a variant, the shaft 2 is connected to the second freewheel unit 57, while the shaft 60 is connected to the first freewheel unit 56.

FIG. 4 show schematic representations of a freewheel unit 70 according to the invention. This freewheel unit 70 has an inner ring 71, which is the driving ring, and an outer ring 72, which is a driven ring. The two rings 71 and 72 rotate in the same direction 81 of rotation, which is counterclockwise here. This unit 70 corresponds to the first unit 56 in FIG. 3b, for example.

More precisely, the driving ring 71 has mobile rollers 73 distributed around its outer periphery. These rollers 73 are capable of engaging with an inner periphery 74 of the driven ring 72. This periphery 74 is smooth here, but as a variant, it could have raised areas.

The rollers 73 are oriented toward the outside of the inner ring 71 in the direction that the rings 71 and 72 rotate. Each roller 73 is asymmetrical and is rotatable on a rotation axis 75. This rotation axis 75 is off-center with respect to a center of gravity of a roller.

The rollers 73 are mounted on a circular spring 76, shown as a dotted line. This spring 76 makes the rollers 73 move from a braced position to a free position.

Figures 4A, 4B:
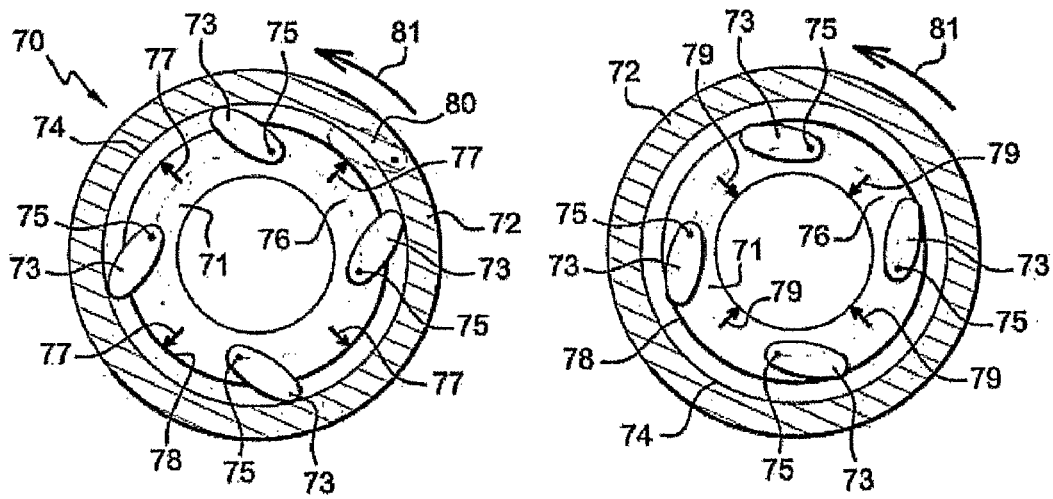

Thus, as FIG. 4a shows, in the braced position, the spring 76 braces the rollers 73 against the inner periphery 74. To this end, forces 77 directed toward the outside of the rings 71, 72 are exerted on the rollers 73 by the spring 76. The braced position of the spring 76 can be observed when the ring 71 is rotating faster than the ring 72.

As FIG. 4b shows, in the free position, the spring 76 braces the rollers 73 against an outer periphery 78 of the ring 71. To this end, forces 79 directed toward a center of the rings 71, 72 are exerted on the rollers 73 by the spring 76. The free position of the spring 76 can be observed when the ring 72 is rotating faster than the ring 71.

As a variant, the rollers are attached to the periphery 74 of the ring 72, like the roller labeled 80. The rollers 80 are capable of bracing themselves against the outer periphery 78 of the ring 71. In this variant, the outer ring 72 is the driving ring, while the inner ring 71 is the driven ring. The unit 70 then corresponds to the units 56 and 57 in FIG. 3a and the unit 57 in FIG. 3b.

FIG. 5 shows a schematic representation of a transmission device 1 according to the invention in which the pump 11 is driven regardless of the vehicle operating mode.

In this embodiment, the mechanical assembly 84 has a so-called Ravigneaux-type gear train 85. This gear train 85 provides two degrees of freedom of rotation and four mechanical connecting elements: one for the shaft 2 of the engine 3, another for the shaft 4 of wheels 5, and the two others for the shafts 8 and 9 of the machines 6 and 7.

Like a conventional planetary gear train, this gear train 85 has a first sun gear 86, a planet carrier 87 carrying a first set of planet gears 88.1 and 88.2, and a ring gear 89 that intermesh. In addition, the gear train 85 has a second set of planet gears 90.1 and 90.2, and a second sun gear 91. The second planet gears 90.1 and 90.2 are carried by the planet carrier 87, and mesh simultaneously with the first planet gears 88.1 and 88.2 and with the sun gear 91.

The Ravigneaux gear train 85 can thus be compared to two planetary gear trains 93 and 94. The first gear train 93 includes the first sun gear 86, the first planet gears 88.1 and 88.2, and the ring gear 89. The second gear train 94 includes the second sun gear 91 and the second planet gears 90.1 and 90.2, but it lacks a ring gear. These two gear trains 93 and 94 share the common planet carrier 87. This planet carrier 87 drives pins in simultaneous contact with this planet carrier 87 and the planet gears 88.1, 88.2, 90.1 and 90.2. As a variant, the planet gears 88.1 and 90.1 and the planet gears 88.2 and 90.2 are integral with one another and coaxial.

In this embodiment, the shaft 2 of the heat engine 3 is connected to the shared planet carrier 87. The shaft 4 of wheels 5 is connected to the ring gear 89 via a gear assembly made up of the gear wheels 96 and 97, the shaft 98, and a gear wheel 99.

The ring gear 89 bears two sets of outer teeth 89.1 and 89.2 and a set of inner teeth 89.3 for this purpose. The gear wheel 99 meshes with the outer teeth 89.1. The first planet gears 88.1 and 88.2 mesh with the inner teeth 89.3. And a pinion 101 meshes with the outer teeth 89.2, as will be seen below.

The shaft 8 of the first machine 6 is connectable either to the second sun gear 91 or to the shaft 2 of the engine 3. For this purpose, the transmission device 1 has a first switching device 102 shown enclosed within a dashed line. This first device 102 has pinions 103 and 104 and two distinct dog clutches 105, 106. The pinion 103 and the dog clutch 105 are mounted on the shaft 8, whereas the pinion 104 and the dog clutch 106 are mounted on the engine shaft 2.

Thus, when the shaft 8 is connected to the second sun gear 91, the dog clutch 105 makes a connection between the pinion 103 and the shaft 8, while the pinion 104 spins freely on the shaft 2. The shaft 8 is then connected to the second sun gear 91 via a gear assembly made up of the pinion 103 and the gear wheel 109, and a hollow shaft 110 connecting the gear wheel 109 to the sun gear 91. When the shaft 8 is connected to the engine shaft 2, the dog clutch 106 makes a connection between the pinion 104 and the shaft 2, while the pinion 103 spins freely on the shaft 8. The shaft 8 is thus connected to the shaft 2 via a gear assembly made up of the gear wheel 111 and the pinion 104.

The shaft 9 of the second machine 7 is connectable either to the shaft 4 of wheels 5 or to the first sun gear 86. For this purpose, the device 1 has a second switching device 115. This device 115 has pinions 101, 116, and a one-piece dog clutch 117.

When the shaft 9 is connected to the shaft 4 of wheels 5, the dog clutch 117 makes a connection between the pinion 101 and the shaft 9, while the pinion 116 spins freely on the shaft 9. The shaft 9 is then connected to the shaft 4, in particular via the pinion 101, the ring gear 89 and the shaft 98. When the shaft 9 is connected to the first sun gear 86, the dog clutch 117 makes a connection between the pinion 116 and the shaft 9, while the pinion 101 spins freely on the shaft 9. The shaft 9 is then connected to the first sun gear 86 via a gear assembly made up of the pinion 116 and the gear wheel 118, and a hollow shaft 119 connecting the gear wheel 118 to the sun gear 86.

In this embodiment, the connection between the oil pump 11 and the transmission device is such that it allows the pump to be driven in all the vehicle operating modes.

To this end, the pump 11 is positioned at the end of the shaft 2, after the shared planet carrier 18, and is connected to the engine shaft 2 and to the ring gear 89 via the freewheel mechanism 12. This freewheel mechanism 12 is of the same type as that in FIG. 3b. This way, the machine shaft 9 is connected to the pump 11 via the ring gear 89 of the gear train 85, this ring gear 89 being connected directly to the freewheel unit 57 attached to the pump shaft 55. In addition, an end of the shaft 2 is connected directly to the freewheel unit 56 attached to the oil pump shaft 55.

More precisely, the pump shaft 55 being hollow, the freewheel 56 is positioned between an inner face of this shaft 55 and an outer face of the engine shaft 2, which is a solid shaft. The engine shaft 2 is connected to the driving ring 61, while the pump shaft 55 is connected to the driven ring 62 of the freewheel 56.

In addition, the freewheel 57 is positioned between an outer face of the shaft 55 and an inner face of the hollow shaft of the ring gear 89. The ring gear 89 is connected to the driving ring 63, whereas the pump shaft 55 is connected to the driven ring 64 of the freewheel 57.

The freewheel units 56 and 57 are concentric. In addition, the axes of the shafts 2 and 55 and the axis of the ring gear 89 are the same.

This way, in a hybrid operation of the vehicle, the pump 11 is driven by the engine 3 or by one of the electrical machines or by the wheels connected to the ring gear 89. In an electric operation of the vehicle, the pump 11 is driven by one of the electrical machines 6, 7 or by the wheels 5 connected to the ring gear 89. In a combustion operation, the pump 11 is driven by the shaft 2 of the engine 3 or by the wheels connected to the ring gear 89. When the vehicle is stopped, with a machine 6, 7 and/or the engine 3 running, the pump 11 is driven by this machine 6, 7 and/or the engine 3. When the vehicle is being towed, the pump 11 is then driven by the wheels 5 of the vehicle.

As a variant, the invention is employed in hybrid vehicles having an engine and an electrical machine connected to one another via a clutch.

As a variant, the invention is employed with a water pump of the vehicle.

The invention claimed is:

1. Power transmission device for a motor vehicle, comprising:
   a heat engine having an engine shaft and wheels having a shaft of wheels,
   a first electrical machine with a first machine shaft and a second electrical machine with a second machine shaft, and
   a mechanical assembly connecting the shaft of the engine, the first and second machine shafts and the shaft of wheels to one another, so that the wheels are drivable by any one of the engine, the first machine and the second machine, via the mechanical assembly,
   an oil or water pump having a pump shaft,
   a freewheel mechanism that drives the pump shaft, the engine shaft and the first and second machine shafts being connected to the freewheel mechanism,
   wherein the freewheel mechanism has a first freewheel unit and a second freewheel unit distinct and independent of one another,
   the first and second freewheel units being ring-shaped and concentric with one another,
   the pump shaft and the engine shaft being concentric,
   wherein the first freewheel unit is directly coupled mechanically to the engine shaft, and
   wherein the second freewheel unit is directly coupled mechanically to an element of the mechanical assembly which is also directly coupled mechanically to the shaft of wheels, wherein the mechanical assembly has a Ravigneaux-type gear train, and
the element of the mechanical assembly directly coupled to the second freewheel unit and to the shaft of wheels is a ring gear of the gear train,
the first machine shaft is connected, in a first connection mode of the first machine, to a second sun gear of the gear train, and in a second connection mode of the first machine, to the engine shaft,
the second machine shaft is connected, in a first connection mode of the second machine, to the shaft of wheels, and in a second connection mode of the second machine, to a first sun gear of the gear train.

2. Device according to claim 1, in which:
the pump is driven when the vehicle is operating in a hybrid mode, when the vehicle is operating in an electrical mode, when the vehicle is stopped with at least one among the engine, the first machine and the second machine running, and when the vehicle is moving in reverse or being towed.

3. Device according to claim 1, in which:
the freewheel mechanism is positioned at an end of the engine shaft,
the end of the engine shaft being connected directly to the first freewheel unit.

4. Device according to claim 1, in which:
the element of the machine mechanical assembly and the pump shaft are concentric.

5. Device according to claim 1, in which:
each of the first and second freewheel units has a respective driving ring and a respective driven ring,
wherein, in each of the first and second freewheel units:
the driving ring rotationally drives the driven ring when the driving ring is rotating at a speed greater than or equal to a rotating speed of the driven ring, and
the driven ring rotates freely inside the driving ring when the driven ring is rotating at a speed greater than the rotating speed of the driving ring,
and wherein the pump shaft is connected to the driven rings, the shaft of the engine and the machine shaft being connected to the first and second driving rings, respectively.

6. Device according to claim 5, in which:
the driving ring and the driven ring of one of the two freewheel units correspond to an inner ring and an outer ring, respectively, of this unit, whereas the driving ring and the driven ring of the other unit correspond to an outer ring and an inner ring, respectively, the outer rings having a greater diameter than the inner rings.

7. Device according to claim 6, in which:
the pump shaft and the machine shafts are hollow shafts, whereas the engine shaft is a solid shaft.

8. Device according to claim 5, in which:
the driving rings have mobile rollers disposed on one of their peripheries, these rollers engaging with a periphery of the driven rings, these rollers being oriented in the direction that the driving rings rotate.

9. Device according to claim 8, in which:
the rollers are mounted on a circular spring, this spring making the rollers move from a braced position to a free position, these rollers having an axis off-center relative to their center of gravity.

10. Device according to claim 6, in which:
the driving rings have mobile rollers disposed on one of their peripheries, these rollers engaging with a periphery of the driven rings, these rollers being oriented in the direction that the driving rings rotate.

11. Device according to claim 10, in which:
the rollers are mounted on a circular spring, this spring making the rollers move from a braced position to a free position, these rollers having an axis off-center relative to their center of gravity.

12. Device according to claim 7, in which:
the driving rings have mobile rollers disposed on one of their peripheries, these rollers engaging with a periphery of the driven rings, these rollers being oriented in the direction that the driving rings rotate.

13. Device according to claim 12, in which:
the rollers are mounted on a circular spring, this spring making the rollers move from a braced position to a free position, these rollers having an axis off-center relative to their center of gravity.

* * * * *